United States Patent [19]
Lammers et al.

[11] Patent Number: 5,366,173
[45] Date of Patent: Nov. 22, 1994

[54] TAPE CARTRIDGE REEL BRAKE RELEASE TECHNIQUE

[75] Inventors: Gerald B. Lammers, Boulder; Patrick M. Barton, Golden; Lynn C. Jacobs; Michael V. Konshak, both of Louisville, all of Colo.

[73] Assignee: Storage Technology Corporation, Louisville, Colo.

[21] Appl. No.: 24,683

[22] Filed: Mar. 1, 1993

[51] Int. Cl.⁵ .............................................. G11B 23/08
[52] U.S. Cl. ................................................. 242/338.1
[58] Field of Search ............ 242/197, 198, 199, 338.1; 360/132

[56] References Cited

U.S. PATENT DOCUMENTS

| | | | |
|---|---|---|---|
| 3,666,202 | 5/1972 | Wenner | 242/197 X |
| 3,857,531 | 12/1974 | Jantzen | 242/197 |
| 3,908,930 | 9/1975 | Gresens | 242/197 |
| 4,014,042 | 3/1977 | Schoettle et al. | 242/197 X |
| 4,214,690 | 7/1980 | Papst et al. | 242/198 X |
| 4,535,370 | 8/1985 | Gervais | 360/132 X |
| 4,555,077 | 11/1985 | Platter et al. | 242/198 |
| 4,767,079 | 8/1988 | Saito et al. | 242/197 |
| 4,896,238 | 1/1990 | Oogi et al. | 360/132 |
| 4,989,106 | 1/1991 | Uehara | 360/132 X |
| 5,027,249 | 6/1991 | Johnson et al. | 242/199 X |
| 5,227,935 | 7/1993 | Gorden et al. | 360/95 |

*Primary Examiner*—Daniel P. Stodola
*Assistant Examiner*—John P. Darling
*Attorney, Agent, or Firm*—John R. Ley

[57] ABSTRACT

A reel brake of a magnetic tape single-reel cartridge is released by a contact member positioned in non-rotational contact with the reel brake release button to prevent wear, vibration and noise in the mechanism. One embodiment places a spindle in a centering cone of a hub which operatively engages the tape reel. The centering cone rotates relative to the spindle which is in stationary contact with the release button. A second embodiment involves use of a non-rotating center shaft of a motor which has a rotor that rotates about the shaft. The stationary shaft contacts the release button. A third embodiment extends a stationary post through a hollow rotating motor shaft to contact the release button.

19 Claims, 3 Drawing Sheets

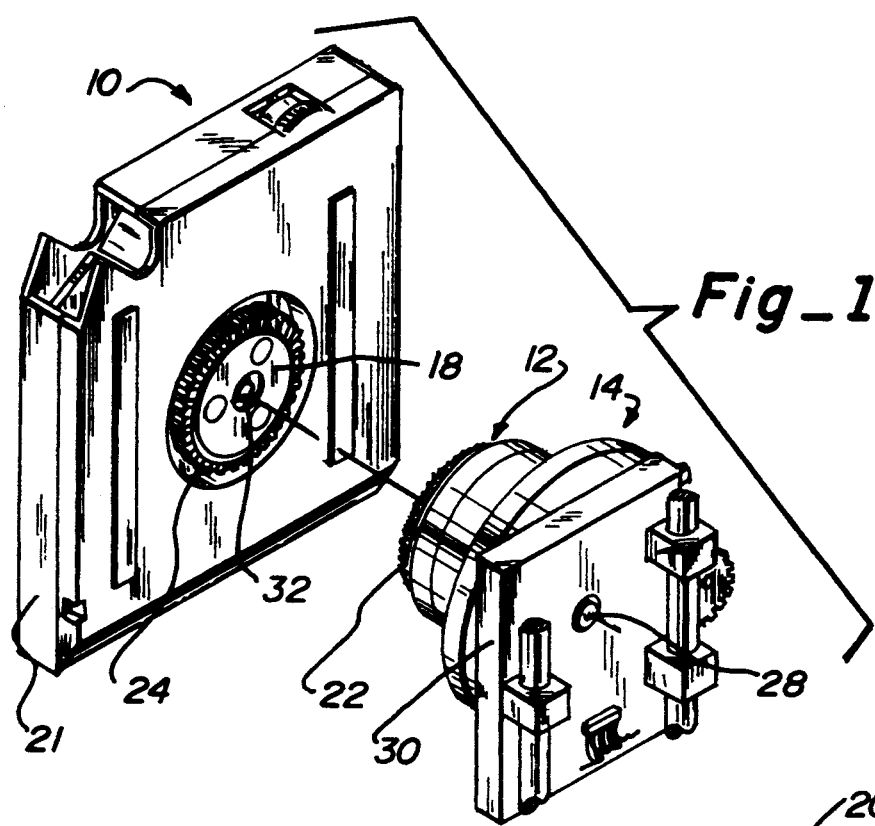
Fig_1
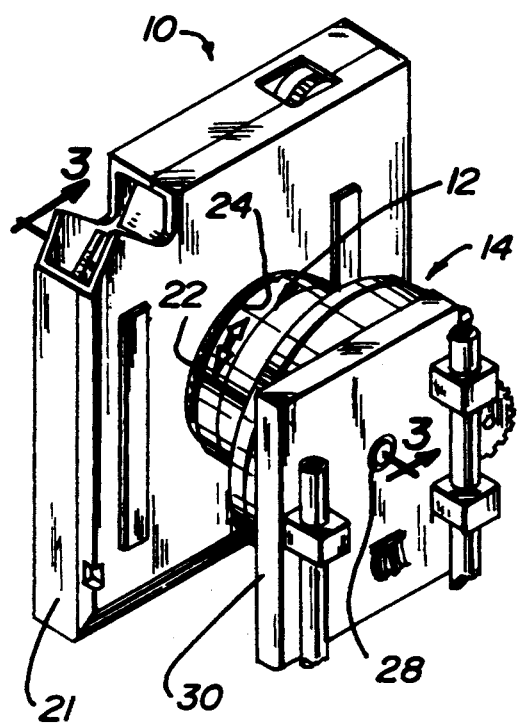
Fig_2
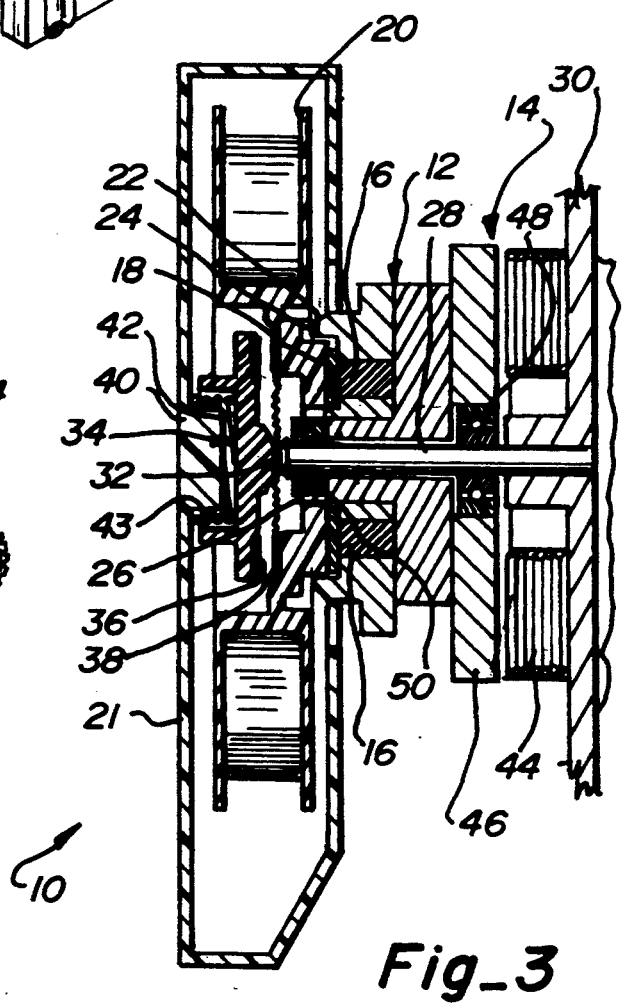
Fig_3

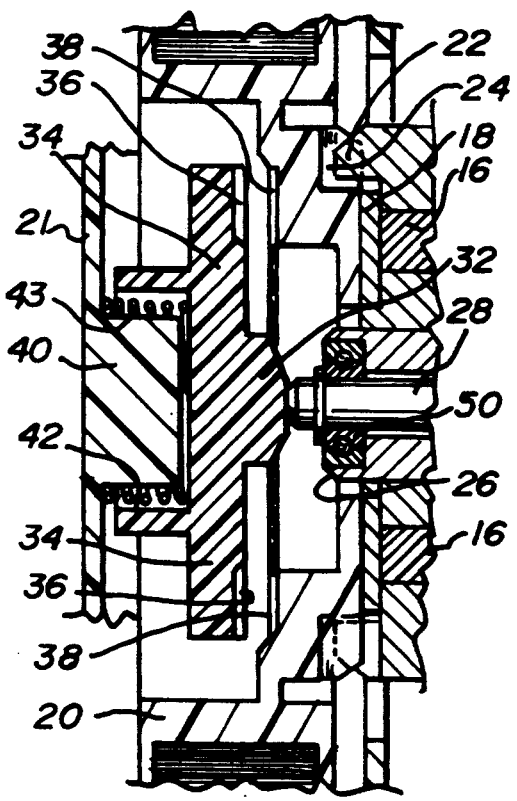
Fig_5
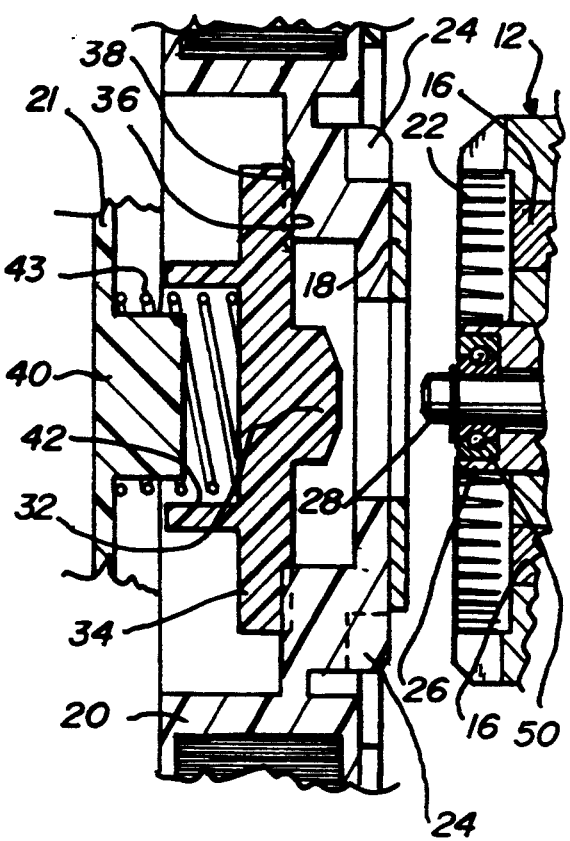
Fig_4
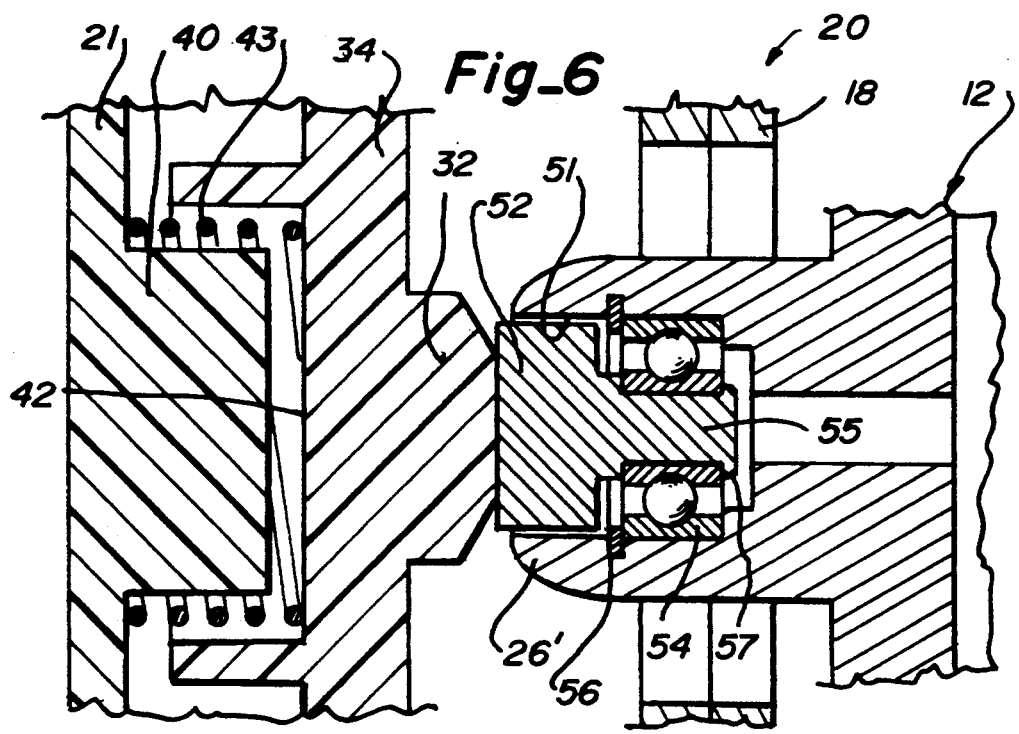
Fig_6

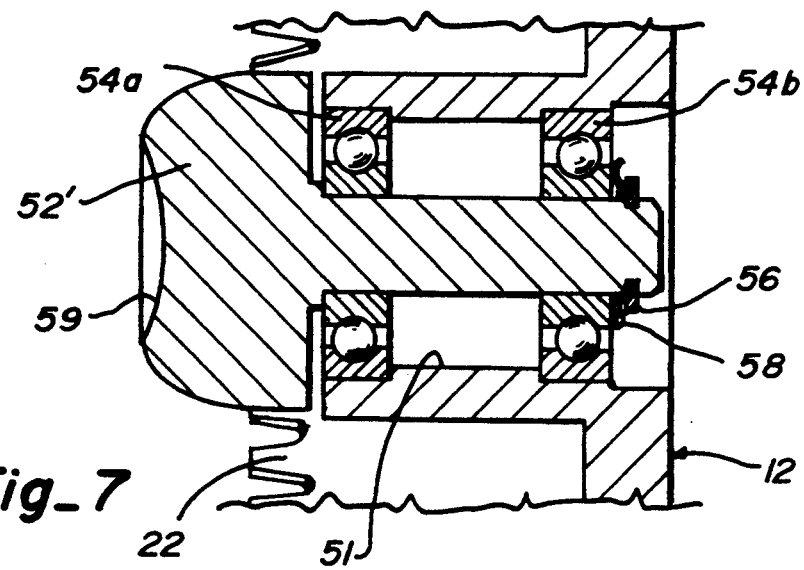
Fig_7
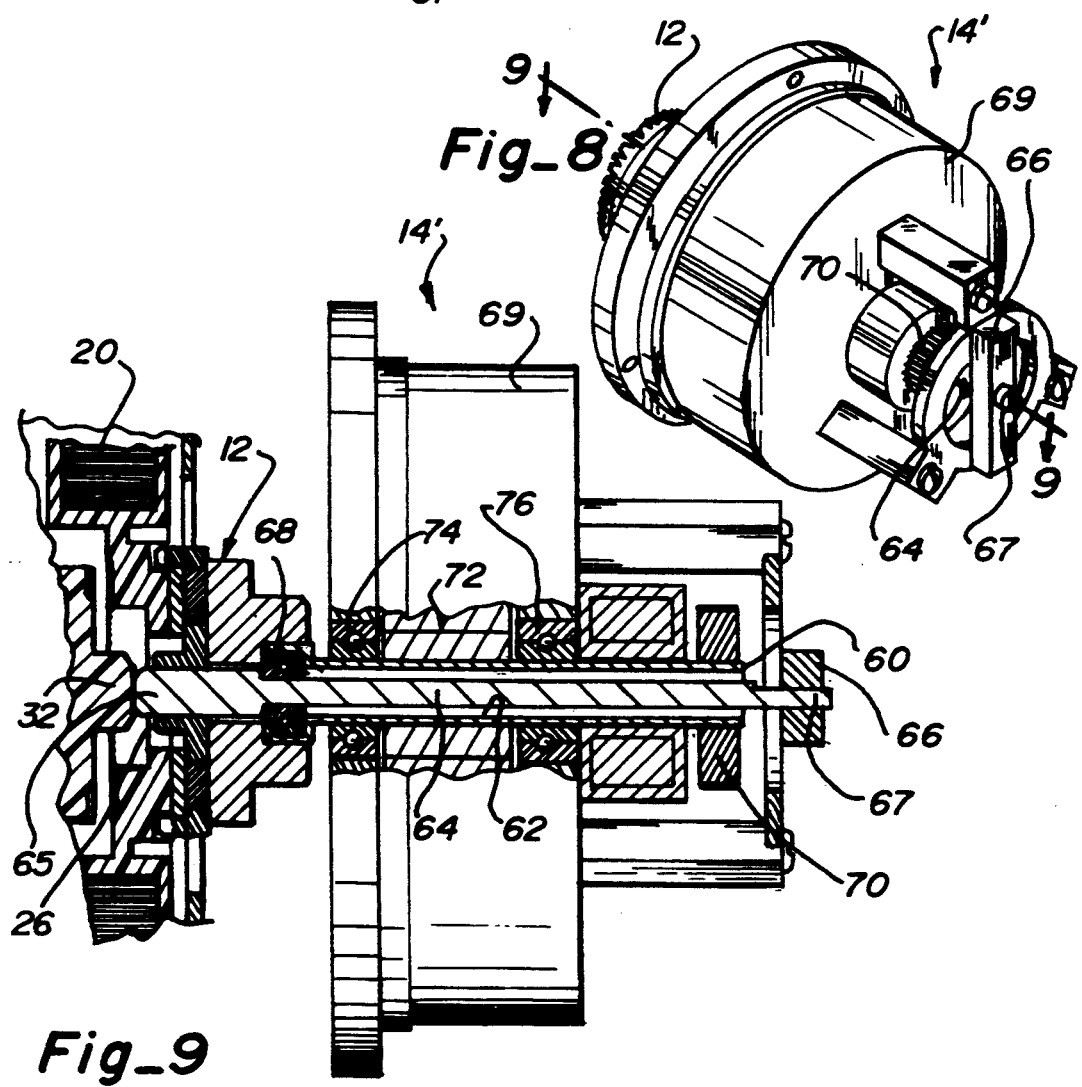
Fig_8
Fig_9

TAPE CARTRIDGE REEL BRAKE RELEASE TECHNIQUE

BACKGROUND OF THE INVENTION

The present invention relates to new and improved apparatus and method for releasing a reel brake in a magnetic-tape, single-reel cartridge, and more particularly, to releasing the reel brake by non-rotational contact with the reel brake to prevent wear, vibration and noise when the tape reel is rotated by a tape drive mechanism.

An industry standard magnetic-tape, single-reel cartridge, such as a 3480 tape cartridge, employs an internal reel brake mechanism to prevent the tape reel within the cartridge from rotating when the cartridge is not operatively engaged by a tape drive mechanism. The reel brake thereby prevents the tape from unwinding or prevents unintended slack in the tape on the reel from occurring, either of which situations could cause problems in use.

When the tape cartridge is operatively engaged by the tape drive mechanism, a drive hub and centering cone contact a release button formed on the reel brake, disengaging the reel brake and permitting the reel to rotate. At the same time, teeth on the drive hub engage teeth on the reel, preventing the reel from turning except as controllably moved by a motor of the tape drive mechanism.

As the tape drive mechanism turns the reel, the brake is held stationary by its connection to the cartridge housing. However, the drive hub and centering cone make rotational frictional contact with brake release button due to rotation of the centering cone and hub while in contact with the stationary brake release button. The friction and dynamic effects caused by contact between rotating centering cone and hub and non-rotating brake release button lead to wear, vibration and audible noise. The wear, vibration and friction may lead to early deterioration of the cartridge and degradation in performance, particularly under the influence of tape speeds exceeding two meters per second, for example.

SUMMARY OF THE INVENTION

The present invention overcomes the deficiencies of the prior art by establishing a non-rotating contact member or interface to release the stationary reel brake button when the cartridge is operatively engaged with the drive mechanism, thereby avoiding relative movement and the problems caused by the relative movement of the brake release button and the surface which contacts the brake release button. Several embodiments of the present invention are disclosed, each providing a solution to the deficiencies found in the prior art.

One embodiment of the present invention involves the use of a drive hub and centering cone having a centrally positioned spindle. The spindle is rotationally connected to the hub and centering cone, permitting the spindle to rotate relative to the hub and centering cone. The spindle is brought in contact with the brake release button, disengaging the reel brake. As the drive mechanism motor turns the reel, the spindle is held stationary relative to the stationary brake release button, and the spindle rotates relative to the hub on its bearings.

A second embodiment of the present invention involves the use of a non-rotating center shaft of the tape drive motor. The rotor of the motor rotates about the fixed shaft, and the fixed shaft extends past the centering cone sufficiently to release the brake release button when the cartridge is mated with the tape drive mechanism. Both the brake release button and the center shaft remain stationary while the hub and reel rotate.

A third embodiment uses a hollow rotating motor shaft with a fixed shaft placed therein. The fixed shaft extends sufficiently beyond the centering cone to engage the brake release button, disengaging the reel brake, and providing non-rotating contact with the stationary brake release button.

By avoiding the relative movement between the brake release button and the contact member which disengages the reel brake, the problems of wear, vibration and general degradation in operation and useful life of the cartridge are effectively and conveniently avoided.

The above described improvements of the present invention over the prior art will become apparent from the following detailed description when considered in conjunction with the accompanying drawings.

BRIEF DESCRIPTION OF THE DRAWINGS

FIG. 1 is an exploded perspective view of a single reel tape cartridge and a tape drive mechanism prior to the mating or operative engagement of the tape cartridge with the tape drive mechanism.

FIG. 2 is a perspective view of the tape cartridge and drive mechanism shown in FIG. 1 in operative engagement.

FIG. 3 is a cross-sectional view taken through line 3—3 of FIG. 2.

FIG. 4 is an enlarged portion of FIG. 3, showing portions of the cartridge and a hub of the drive motor before operative engagement.

FIG. 5 is an enlarged portion of FIG. 3 showing portions of the cartridge and the hub of the drive motor after operative engagement.

FIG. 6 is a cross-sectional view of a portion of a spindle rotationally connected to a drive hub and a centering cone of a tape drive mechanism and of a portion of a brake release button of a cartridge, of illustrating another embodiment of the present invention.

FIG. 7 is a cross-sectional view of an alternate spindle to that spindle shown in FIG. 6.

FIG. 8 is a rear perspective view of a drive motor of a tape drive mechanism incorporating another embodiment of the present invention.

FIG. 9 is an enlarged cross-sectional view taken through line 9—9 of the motor shown in FIG. 8, and also showing a cross-sectional view of portions of the tape cartridge in operative engagement with the tape drive mechanism.

DETAILED DESCRIPTION OF THE PREFERRED EMBODIMENT

The present invention is directed to providing a non-rotating contact member to engage and release a brake release button of a single-reel tape cartridge when the cartridge is in operative engagement with a tape drive mechanism. As a result, there is no relative movement between the contact member and the brake release button to cause wear, vibration, noise, and a general degradation in performance or useful longevity.

Referring now to FIGS. 1, 2 and 3, a conventional elevator assembly (not shown) transfers an industry standard single-reel magnetic-tape cartridge 10, such as the 3480 cartridge, into contact with a chuck or drive hub 12 of a tape drive motor 14 of a tape drive mechanism. The hub 12 has a magnet 16 which attracts and holds a flat metallic washer 18 connected at the center of a tape reel 20 contained within a housing 21 for the cartridge 10. In doing so, a circular ring of teeth 22 formed on the hub 12 engage a circular ring of teeth 24 formed on the reel 20. The engaged teeth 22, 24 allow the motor 14 and hub 12 to rotate the reel 20. A centering cone 26 is formed on or attached to the hub 12 to help center the hub 12 and the tape reel 20 so that the magnet 16 will more readily interact with and attract the washer 18, causing the hub and reel teeth 22, 24 to mesh. When the magnet 16 interacts with the washer 18 to engage the teeth 22, 24, a non-rotating shaft 28, attached to a stationary base plate 30 for the motor 14, engages a brake release button 32 formed on a reel brake 34, releasing the brake 34 as hereinafter described.

The reel brake 34 is conventional and best depicted in FIGS. 4 and 5, radial teeth 36, 38 extend outwardly on both the brake 34 and reel 20. When the radial teeth 36, 38 are meshed, it is impossible to rotate the reel 20 relative to the cartridge housing 21. The brake 34 is held stationary with respect to the cartridge housing 21 by a rectangular flange 40 formed on the housing 21 and extending into a complimentary-shaped rectangular slot 42 formed in the brake 34. A spring 43 is interposed around the flange 40 and into the slot 42 and interacts with brake 34 to bias it outward normally forcing its radial teeth 36 into an engagement with the radial teeth 38 of the reel 20, thereby preventing the reel 20 from rotating. Thus, it may be seen that the brake 34 prevents the reel 20 from rotating until the cartridge 10 is in actual operative engagement with the hub 12 and until rotated by the motor 14.

Referring to FIG. 3, the non-rotating center shaft 28 and motor windings 44 are affixed to the stationary base plate 30 of the motor 14. A rotor 46 of the motor 14 is connected to the hub 12 and both are positioned to rotate about the fixed center shaft 28. The fixed center shaft 28 extends forward a sufficient distance past the centering cone 26 to engage the brake button 32, as is also shown in FIG. 5. The rotor 46 and the hub 12 are connected to the shaft 28 by bearings 48, 50, permitting rotor 46 and the hub 12 to rotate relative to the fixed shaft 28.

When the cartridge 10 is operatively engaged with the drive hub 12, as above described, the extended non-rotating center shaft 28 contacts the brake button 32, disengaging the radial teeth 36, 38 while, simultaneously, the metallic washer 18 of the reel is attracted by the magnet 16 in the hub 12, bringing the circular ring of teeth 22 on the hub 12 into contact with the circular ring of teeth on the reel 20. With the brake 34 released, the rotation of the hub 12 by the motor rotates the reel 20. The stationary positions of the shaft 28 and the button 32 avoid wear, vibration, noise and adverse operating affects as the reel 20 rotates.

While the motor 14 shown is a 'wide-gap' brushless DC motor, it will be apparent to those skilled in the art that other motors using external rotors which rotate about a fixed center shaft may be used in accordance with the present invention.

The above described operation of the rotation of the reel 20 by the hub, and the release of the reel brake are common to the various embodiments.

Referring now to FIG. 6, a second embodiment of the present invention is depicted. In this embodiment, the hub 12 has a centering cone 26' which includes a receptacle 51 in which to receive a spindle 52 at a forward end of the cone 26'. The spindle 52 thus contacts and releases the brake 34. The spindle 52 is connected to the cone 26' by a rotational bearing 54 which permits the spindle 52 to rotate relative to the hub 12. The bearing 54 fits on to a shaft 55, and a lip 57 at the end of the shaft 55 permanently holds the bearing 54 in position on the spindle 52. The bearing 54 and the connected spindle 52 are held in position by a retaining ring 56. When the reel 20 is in operative engagement with the hub 12 as above-described, the forward end of the spindle 52 contacts the brake button 32, releasing the reel brake 34.

The spindle 52 is held stationary by frictional contact between the spindle 52 and the stationary brake button 32, as the hub 12 rotates the reel 20. The spindle 52 has an insert-type thrust bearing 54, which permits the centering cone 26' and hub 12 to rotate relative to the spindle 52 when the spindle 52 is in contact with the brake button 32. Additionally, it may be advantageous to place an elastomer insert (not shown) on the end of the spindle 52 to increase friction between the spindle 52 and the brake button 32.

Referring now to FIG. 7, an alternate to the embodiment depicted in FIG. 6 is shown. In this embodiment, two bearings 54a and 54b support the spindle 52' and a small wavy-spring washer 58 provides preload for the pair of bearings 54a, 54b. An indented or concave surface 59 is formed in the forewardmost end of the spindle 52 to better center with and engage the brake button. As previously described in conjunction with FIG. 6, the spindle 52' contacts the brake button 32 and the hub 12 rotates with respect to the spindle 52. Again, an elastomer may be placed at the indented surface 59 of the spindle 52' to increase friction with the brake button 32.

Referring now to FIGS. 8 and 9, yet another embodiment of the present invention is shown. This embodiment differs from the previous first embodiment in that it is intended for use with a drive motor 14' having a rotating motor shaft 60. The rotating motor shaft 60 has a long center hole 62 drilled or otherwise extended through or along its length. A fixed shaft or post 64 of lesser diameter is inserted in the center hole 62. An end 65 of the post 64 extends through and beyond the centering cone 26 of hub 12 to push against brake button 32 when reel 20 is brought into operative engagement with the hub. The post 64 is clamped at an opposite end 67 in a bracket 66 connected to a housing 69 of the motor 14'. Due to the fixed position of the post 64, there is no relative motion between the brake button 32 and the end 65 of the fixed post 64. A ball bearing 68 inside the hub end of the motor shaft 60 centers the fixed post 64 inside the motor shaft 60, and the bracket 66 attached to the other end of the housing 69 clamps the fixed post 64. Sufficient clearance is provided between the fixed post 64, and the rotating shaft 60 and the hub 12 to prevent contact and binding between the shaft 60 and the post 64.

A rotor 72 is attached to the shaft 60, and the shaft is rotationally supported by the bearings 74 and 76. Additionally, a small thumb wheel 70 is attached to the end of the rotating motor shaft 60 opposite from the hub 12 to allow manual rotation of the shaft 60 and the engaged tape reel 20 in case tape tension is lost and the tape must be rewound or adjusted manually.

As is apparent from the previous description, the present invention and the three embodiments specifically disclosed establish stationary contact with the brake release button of the brake of a single-reel tape cartridge. Consequently, the wear, noise, vibration and adverse operating aspects of rotational contact with release button have been avoided, thereby achieving considerable improvements in performance and useful longevity of the cartridge.

Although the specific embodiments have been described in detail hereinbefore, it is understood that the subject invention is not limited thereto, and variations and modifications thereof are contemplated and are included within the scope of the invention as defined by the appended claims.

We claim:

1. In a tape drive mechanism including a motor and a drive hub connected to be rotated about a rotational axis by the motor, the drive hub adapted for rotating a tape reel of a tape cartridge about a rotational axis which is the same rotational axis as the hub, the cartridge having a rotationally stationary reel brake located at the rotational axis of the tape reel for preventing the rotation of the reel until released; an improved apparatus for releasing the reel brake upon operative engagement of the reel with the hub, comprising:

a contact member located at the rotational axis of the hub to allow the hub to rotate relative to the contact member, the contact member extending to a position to contact and release the reel brake upon operative engagement of the hub and the tape reel, the contact member remaining stationary relative to the reel brake while in contact with the reel brake during rotation of the tape reel and the hub.

2. A tape drive mechanism as defined in claim 1, wherein the motor rotates about a rotational axis, and said contact member extends along the rotational axis of the motor.

3. A tape drive mechanism as defined in claim 2, wherein said contact member comprises a non-rotating center shaft of the motor.

4. A tape drive mechanism as defined in claim 3, wherein the motor includes a rotor which is connected to the hub and the rotor rotates about the center shaft.

5. A tape drive mechanism as defined in claim 4, wherein the hub includes a centering cone located at the rotational axis of the hub, the centering cone adapted for guiding the hub and the tape reel into operative engagement, and the center shaft extends axially through the centering cone.

6. A tape drive mechanism as defined in claim 2, wherein the motor includes a hollow drive shaft, and said contact member comprises a stationary post extending through the hollow drive shaft.

7. A tape drive mechanism as defined in claim 6, wherein the post is elongated and extends from a first end located at the hub to a second opposite end, and the second end is clamped to the tape drive mechanism to maintain the post stationary.

8. A tape drive mechanism as defined in claim 7, wherein the motor further includes a thumb wheel attached to the hollow drive shaft adjacent to the second end of the post, the thumb wheel permitting manual rotation of the shaft and the operatively engaged hub and tape reel.

9. A tape drive mechanism as defined in claim 8, wherein the hub includes a centering cone located at the rotational axis of the hub, the centering cone adapted for guiding the hub and the tape reel into operative engagement, and the post extends axially through the centering cone.

10. A tape drive mechanism as defined in claim 1, wherein said contact member is a spindle.

11. A tape drive mechanism as defined in claim 10, wherein the hub includes a centering cone located at the rotational axis of the hub, the centering cone adapted for guiding the hub and the tape reel into operative engagement, and the spindle is concentrically positioned at the centering cone.

12. A tape drive mechanism as defined in claim 11, wherein the spindle is rotationally connected to the centering cone to permit rotation of the centering cone relative to the spindle while the spindle is held stationary by contact with the stationary reel brake.

13. A tape drive mechanism as defined in claim 12 wherein the spindle forms a center portion of the centering cone.

14. A tape drive mechanism as defined in claim 12, wherein the spindle fully forms an end of the centering cone.

15. A tape drive mechanism as defined in claim 12, wherein the spindle includes an indented surface adapted for contacting the reel brake.

16. A method of releasing a rotationally stationary reel brake at the rotational center of a tape reel in a tape cartridge to allow rotation of the tape reel after release of the reel brake, comprising the steps of:

contacting the reel brake with a contact member upon operatively engaging the tape reel and the hub;

releasing the reel brake by contact with the contact member;

operating the motor to rotate the hub and the engaged tape reel after releasing the reel brake; and maintaining the contact member stationary relative to the reel brake while in contact with the reel brake during rotation of the tape reel and the hub.

17. A method as defined in claim 16, further comprising the step of:

extending the contact member along a rotational axis about which the motor rotates while the contact member is in contact with the reel brake.

18. A method as defined in claim 17, further comprising the step of:

extending the contact member through the rotational axis of the motor and into contact with the reel brake.

19. A method as defined in claim 16, further comprising the steps of:

guiding the hub and the tape reel into operative engagement with a centering cone formed at the rotational axis of the hub; and concentrically positioning the contact member at an end of the centering cone.

* * * * *